US012673226B2

(12) United States Patent
Zhou et al.

(10) Patent No.: US 12,673,226 B2
(45) Date of Patent: Jul. 7, 2026

(54) HARNESS FOR FALL PROTECTION

(71) Applicant: HONEYWELL SAFETY PRODUCTS USA, INC., Charlotte, NC (US)

(72) Inventors: Peng Zhou, Shanghai (CN); XiaoJuan Zhu, Shanghai (CN); Ling Lin, Shanghai (CN); Anbo Sun, Shanghai (CN)

(73) Assignee: Honeywell Safety Products USA, Inc., Latham, NY (US)

( * ) Notice: Subject to any disclaimer, the term of this patent is extended or adjusted under 35 U.S.C. 154(b) by 748 days.

(21) Appl. No.: 17/905,708

(22) PCT Filed: Mar. 19, 2020

(86) PCT No.: PCT/CN2020/080142

§ 371 (c)(1),
(2) Date: Sep. 6, 2022

(87) PCT Pub. No.: WO2021/184280

PCT Pub. Date: Sep. 23, 2021

(65) Prior Publication Data

US 2023/0098769 A1 Mar. 30, 2023

(51) Int. Cl.
*A62B 35/00* (2006.01)

(52) U.S. Cl.
CPC ...... *A62B 35/0018* (2013.01); *A62B 35/0025* (2013.01)

(58) Field of Classification Search
CPC ............ A62B 35/0018; A62B 35/0006; A62B 35/0037; A62B 35/0012; A62B 35/0031
See application file for complete search history.

(56) References Cited

U.S. PATENT DOCUMENTS 4,273,216 A 6/1981 Weissmann
4,553,633 A 11/1985 Armstrong et al.
(Continued)

FOREIGN PATENT DOCUMENTS

CN 1085111 A 4/1994
CN 110214040 A 9/2019
(Continued)

OTHER PUBLICATIONS

European search report Mailed on Sep. 4, 2023 for EP Application No. 20925498, 7 page(s).
(Continued)

*Primary Examiner* — Theodore V Adamos
(74) *Attorney, Agent, or Firm* — Fredrikson & Byron, P.A.

(57) ABSTRACT

A harnesses for fall protection and methods of manufacturing the same are provided. The harness includes a horizontal connecting webbing with a force receiving mechanism. The horizontal connecting webbing including a first horizontal receiving loop at a first end of the horizontal connecting webbing. The harness also includes a first upper webbing configured with a upper webbing loop that is engaged with the first horizontal receiving loop at the first end of the horizontal connecting webbing. The harness further includes a first lower webbing configured with a lower webbing loop that is engaged with first horizontal receiving loop at the first end of the horizontal connecting webbing. The first upper webbing and the first lower webbing are independent of one another. A corresponding method of manufacturing the harness is also provided so as to withstand various large forces during operation.

20 Claims, 7 Drawing Sheets

(56) References Cited

U.S. PATENT DOCUMENTS

| | | | | | |
|---|---|---|---|---|---|
| 5,531,292 | A * | 7/1996 | Bell | A62B 35/0037 182/6 |
| 5,988,315 | A * | 11/1999 | Crane | A62B 35/0018 182/3 |
| 6,122,778 | A * | 9/2000 | Cohen | A62B 35/0006 5/81.1 R |
| 6,125,966 | A * | 10/2000 | Jones | A62B 35/0018 182/6 |
| 6,308,335 | B1 * | 10/2001 | Colorado | A41D 13/0007 2/81 |
| 2006/0102423 | A1 * | 5/2006 | Lang | A62B 35/04 182/36 |
| 2011/0174573 | A1 * | 7/2011 | Myers | A62B 35/00 182/3 |
| 2016/0332010 | A1 * | 11/2016 | Lowell | A62B 35/0018 |
| 2017/0216635 | A1 * | 8/2017 | Stibilj | A62B 35/0018 |
| 2018/0147427 | A1 | 5/2018 | Zedel | |
| 2018/0161606 | A1 | 6/2018 | Quigley et al. | |
| 2018/0161607 | A1 | 6/2018 | Jacob et al. | |
| 2019/0070442 | A1 * | 3/2019 | Jacob | A62B 35/0025 |

FOREIGN PATENT DOCUMENTS

| | | | | |
|---|---|---|---|---|
| DE | 102012014692 | A1 | 1/2014 | |
| FR | 2087763 | A5 | 12/1971 | |
| FR | 2427828 | A1 | 2/1980 | |
| JP | 6499795 | B1 | 4/2019 | |
| WO | WO-2011121242 | A1 * | 10/2011 | A62B 35/04 |
| WO | 2020/039906 | A1 | 2/2020 | |

OTHER PUBLICATIONS

Outgoing—ISA/210—International Search Report Mailed on Dec. 24, 2020 for WO Application No. PCT/CN20/080142, 8 page(s).

International Search Report and Written Opinion mailed on Dec. 24, 2020 for WO Application No. PCT/CN2020/080142, 8 page(s).

CA Office Action Mailed on Dec. 1, 2023 for CA Application No. 3171042, 3 page(s).

* cited by examiner

HARNESS FOR FALL PROTECTION

TECHNOLOGICAL FIELD

An example embodiment relates generally to fall protection systems and, more particularly, to fall protection harnesses.

BACKGROUND

Fall protection devices, such as harnesses, are able to withstand various large forces during operation. Additionally, depending on the application and time during operation, the distribution of force on the harness changes and therefore the harness must be capable of withstanding different force distributions during operation. Through applied effort, ingenuity, and innovation, many of these identified problems have been solved by the methods and apparatus of the present disclosure.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a harness for fall protection is provided. The harness includes a horizontal connecting webbing with a force receiving mechanism. The horizontal connecting webbing including a first horizontal receiving loop at a first end of the horizontal connecting webbing. The harness also includes a first upper webbing configured with a upper webbing loop that is engaged with the first horizontal receiving loop at the first end of the horizontal connecting webbing. The harness further includes a first lower webbing configured with a lower webbing loop that is engaged with first horizontal receiving loop at the first end of the horizontal connecting webbing. The first upper webbing and the first lower webbing are independent of one another In some embodiments, the horizontal connecting webbing also includes a second horizontal receiving loop at a second end of the horizontal connecting webbing opposite the first end of the horizontal connecting webbing. In such an embodiment, the harness also includes a second upper webbing configured with a upper webbing loop to be received by the second horizontal receiving loop at the second end of the horizontal connecting webbing; and a second lower webbing configured with a lower webbing loop to be received by the second horizontal receiving loop at the second end of the horizontal connecting webbing, with the second upper webbing and the second lower webbing being independent of one another. In some embodiments, the upper webbing loop is the end of the first upper webbing fixably attached to another portion of the first upper webbing and the lower webbing loop is the end of the first lower webbing fixably attached to another portion of the first lower webbing.

In some embodiments, the horizontal connecting webbing includes a fastening mechanism configured to connect and disconnect the horizontal connecting webbing for removal. In some embodiments, the fastening mechanism is defined equidistant from the first end of the horizontal connecting webbing and a second end of the horizontal connecting webbing. In some embodiments, the force receiving mechanism is a D ring.

In some embodiments, the harness also includes a lower body harness portion attached to at least one of the first upper webbing, the first lower webbing, the second upper webbing, or the second lower webbing, the lower body harness portion configured to be worn at least around the waist of a user during operation. In some embodiments, the lower body harness body includes a waist webbing attached to at least one of the first lower webbing or the second lower webbing, the waist webbing configured to be sit at approximately the waist of a user during operation. In some embodiments, the first upper webbing is attached to the lower body harness portion at an end of the first upper webbing opposite the upper webbing loop. In some embodiments, the lower body harness body also includes one or more leg webbings configured to receive one of the legs of a user during operation.

In another example embodiment, a method of manufacturing a harness for fall protection is provided. The method includes providing a horizontal connecting webbing with a force receiving mechanism. The horizontal connecting webbing includes a first horizontal receiving loop at a first end of the horizontal connecting webbing. The method also includes creating an upper webbing loop of a first upper webbing by passing the first upper webbing through the first horizontal receiving loop at the first end of the horizontal connecting webbing. The method further includes creating a lower webbing loop of a first lower webbing by passing the first lower webbing through the first horizontal receiving loop at the first end of the horizontal connecting webbing. The first upper webbing and the first lower webbing are independent of one another.

In some embodiments, the method also includes providing a second horizontal receiving loop at a second end of the horizontal connecting webbing opposite the first end of the horizontal connecting webbing; creating an upper webbing loop of a second upper webbing by passing the second upper webbing through the second horizontal receiving loop at the second end of the horizontal connecting webbing; and creating a lower webbing loop of a second lower webbing by passing the second lower webbing through the second horizontal receiving loop at the second end of the horizontal connecting webbing. In such an embodiment, the second upper webbing and the second lower webbing are independent of one another. In some embodiments, the upper webbing loop is created by attaching the end of the first upper webbing to the another portion of the first upper webbing and the lower webbing loop is created by attaching the end of the first lower webbing to the another portion of the first lower webbing.

In some embodiments, the method also includes providing a fastening mechanism on the horizontal connecting webbing configured to connect and disconnect the horizontal connecting webbing for removal. In some embodiments, the fastening mechanism is defined equidistant from the first end of the horizontal connecting webbing and a second end of the horizontal connecting webbing. In some embodiments, the force receiving mechanism is a D ring.

In some embodiments, the method also includes attaching a lower body harness portion to at least one of the first upper webbing, the first lower webbing, the second upper webbing, or the second lower webbing, the lower body harness portion, the lower body harness portion configured to be worn at least around the waist of a user during operation. In some embodiments, the lower body harness body includes a waist webbing attached to at least one of the first lower webbing or the second lower webbing, the waist webbing configured to be sit at approximately the waist of a user during operation. In some embodiments, the first upper webbing is attached to the lower body harness portion at an end of the first upper webbing opposite the upper webbing loop. In some embodiments, the lower body harness body also includes one or more leg webbings configured to receive one of the legs of a user during operation.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1A:
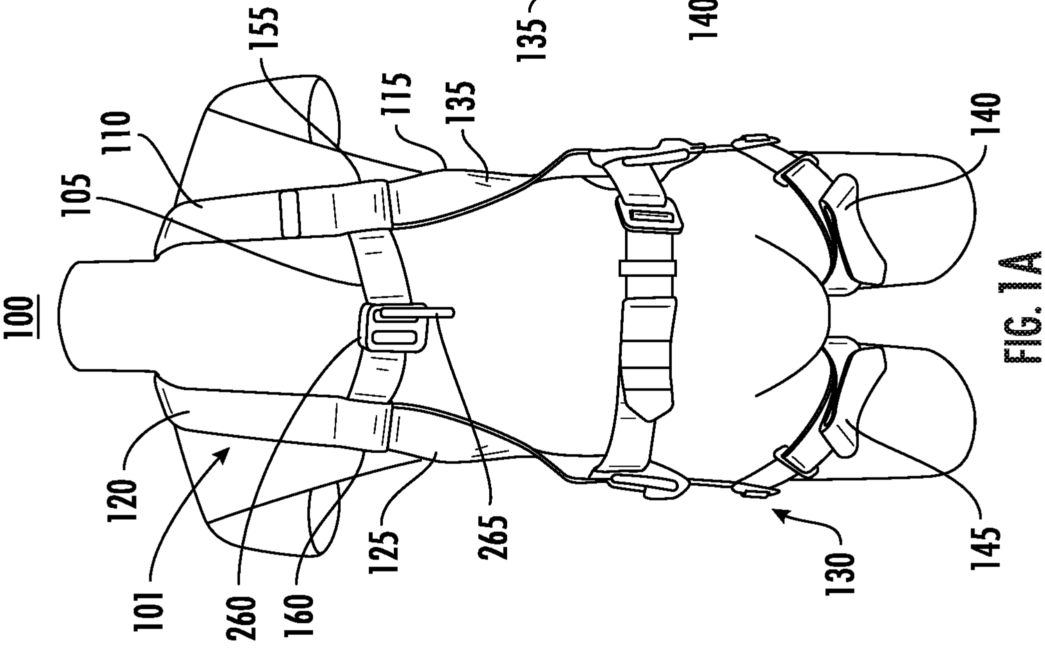
Figure 1B:
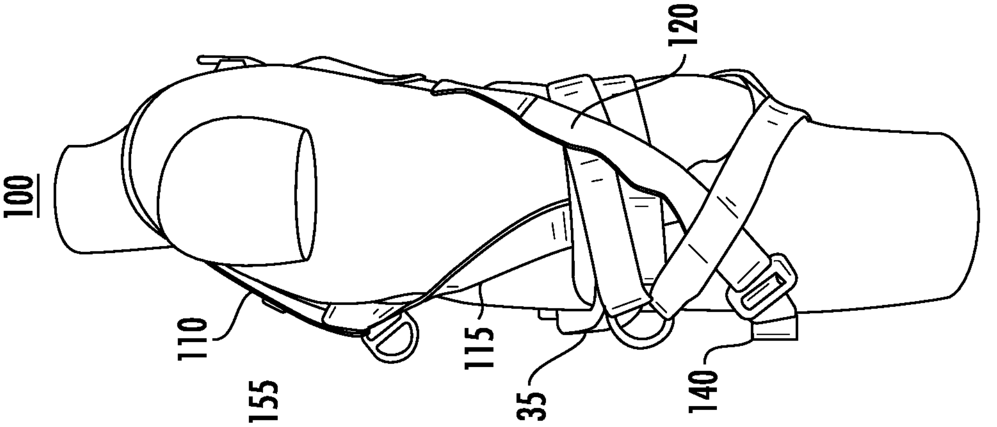
Figure 1C:
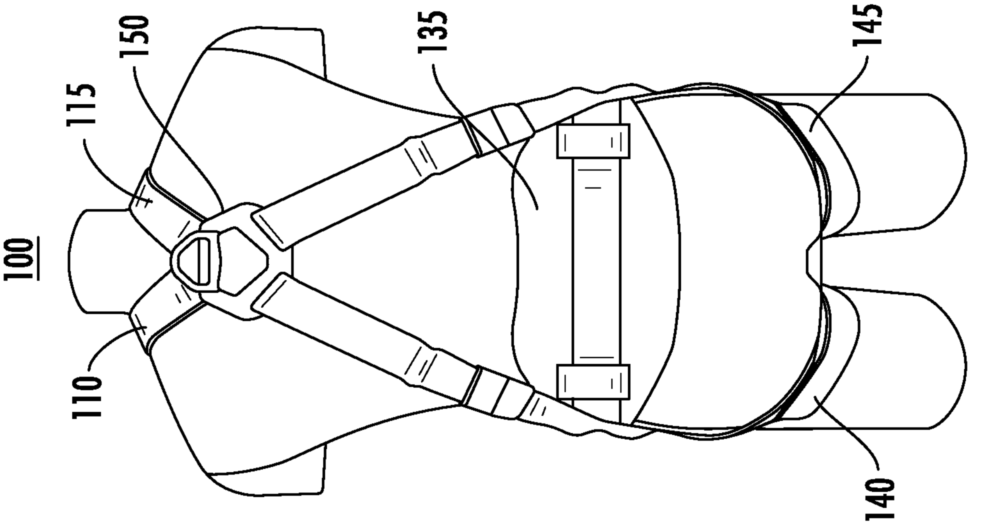
Figure 2:
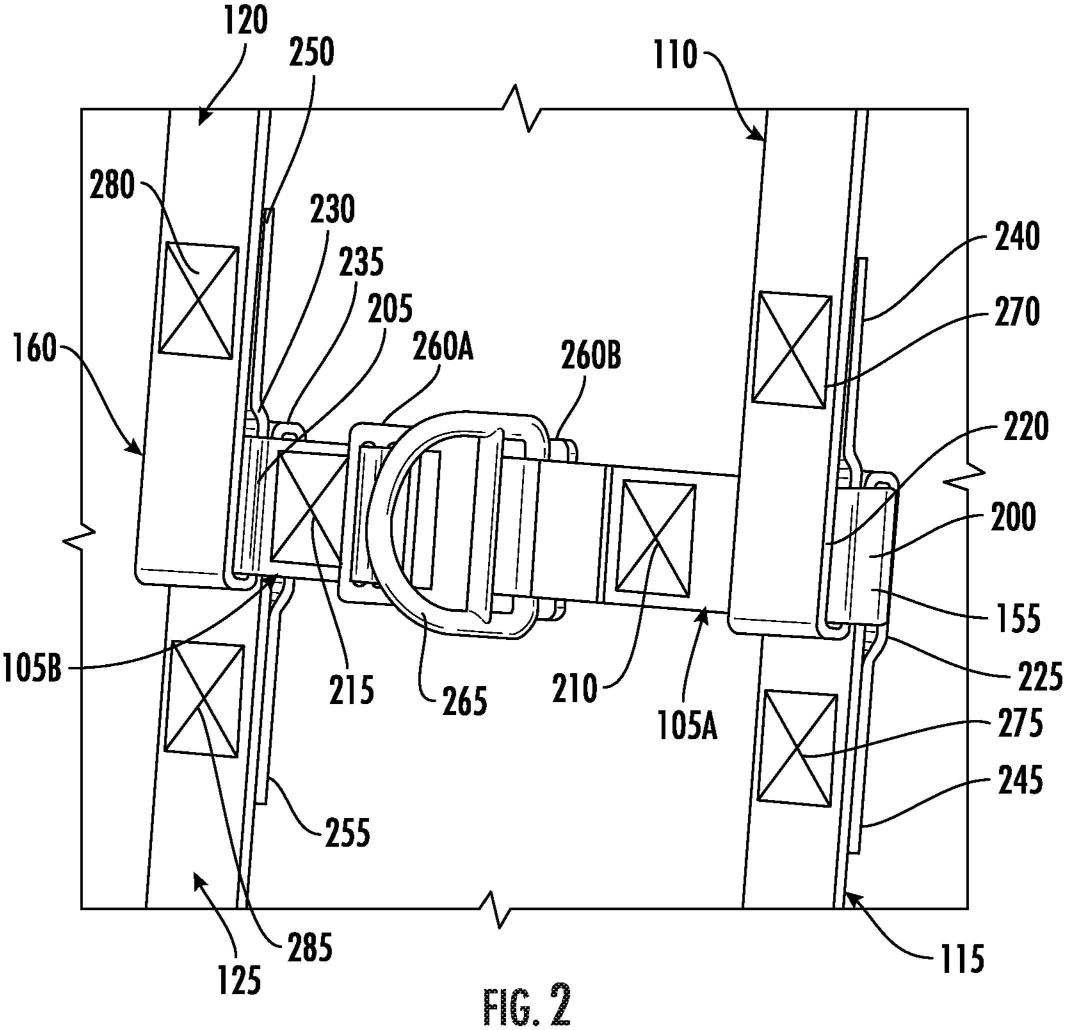
Figure 3:
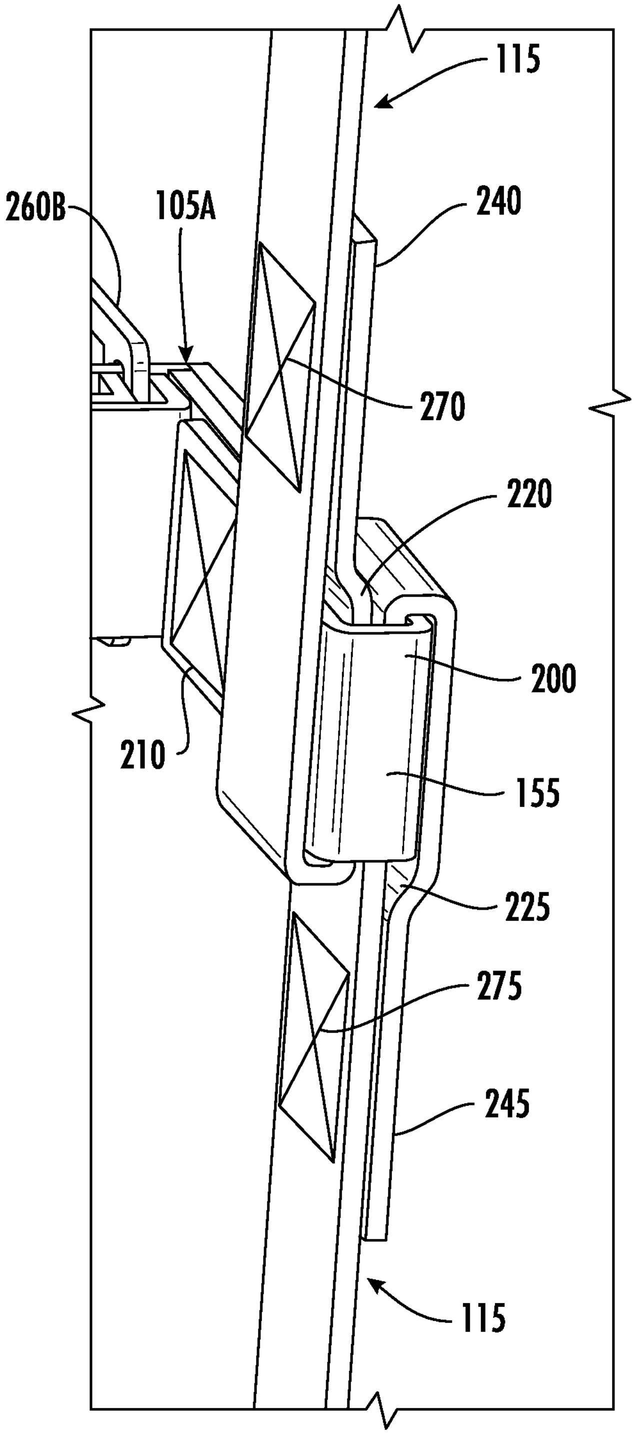
Figure 4:
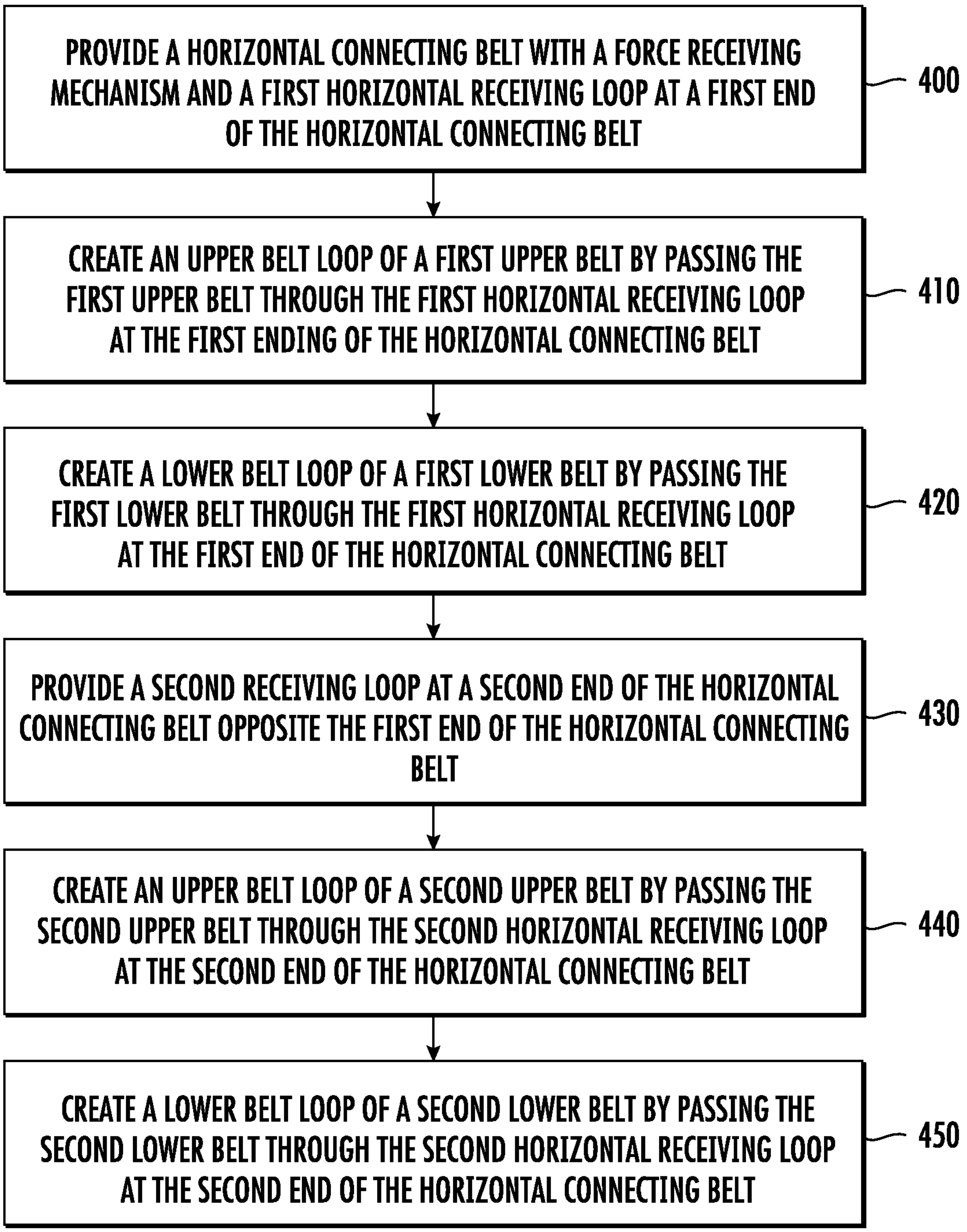
Figure 5A:
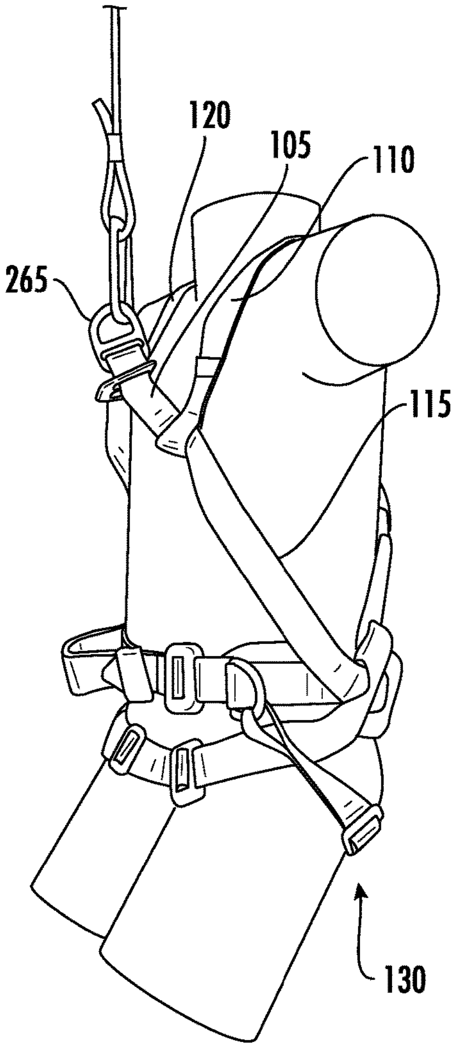
Figure 5B:
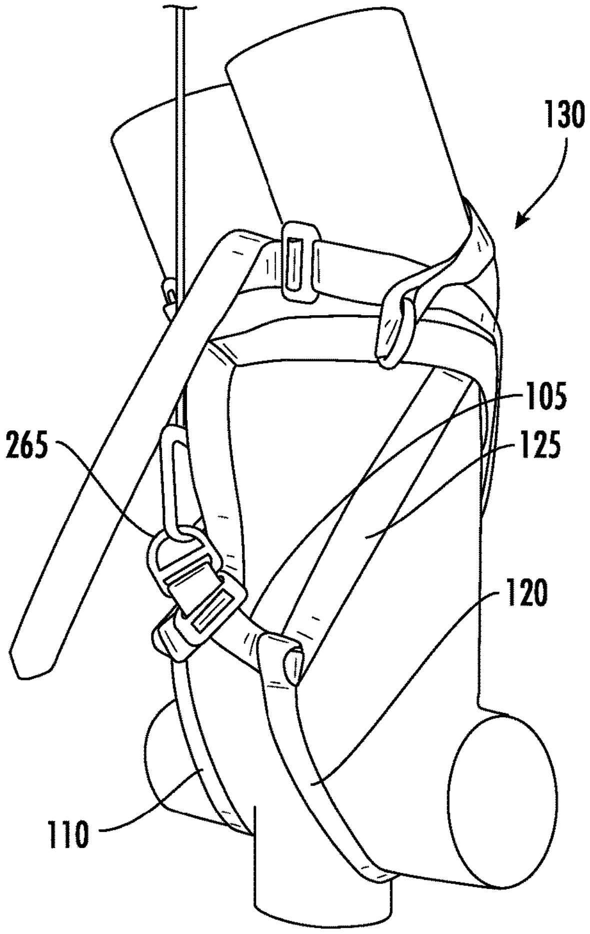
Figure 6A:
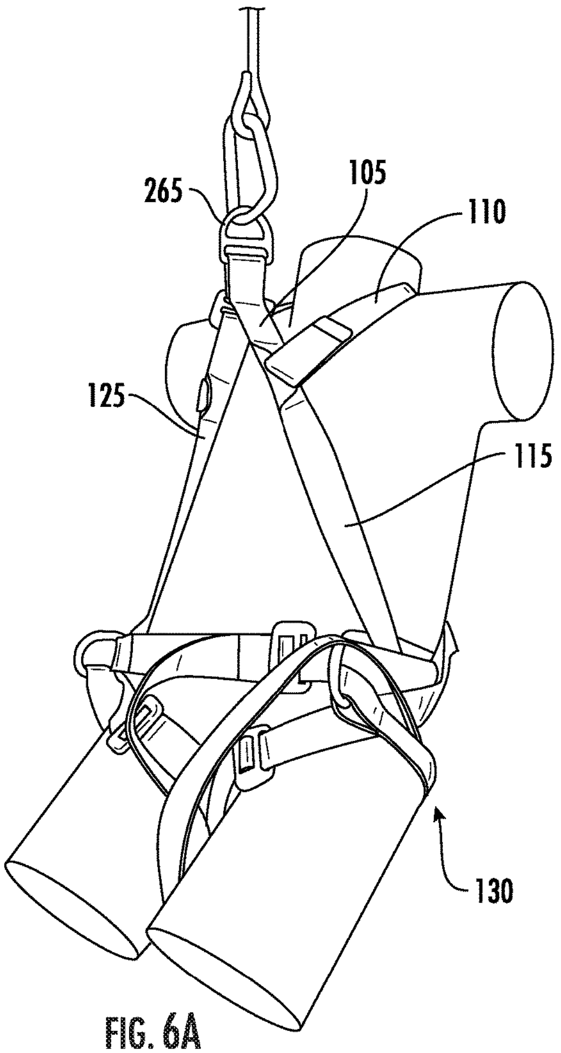
Figure 6B:
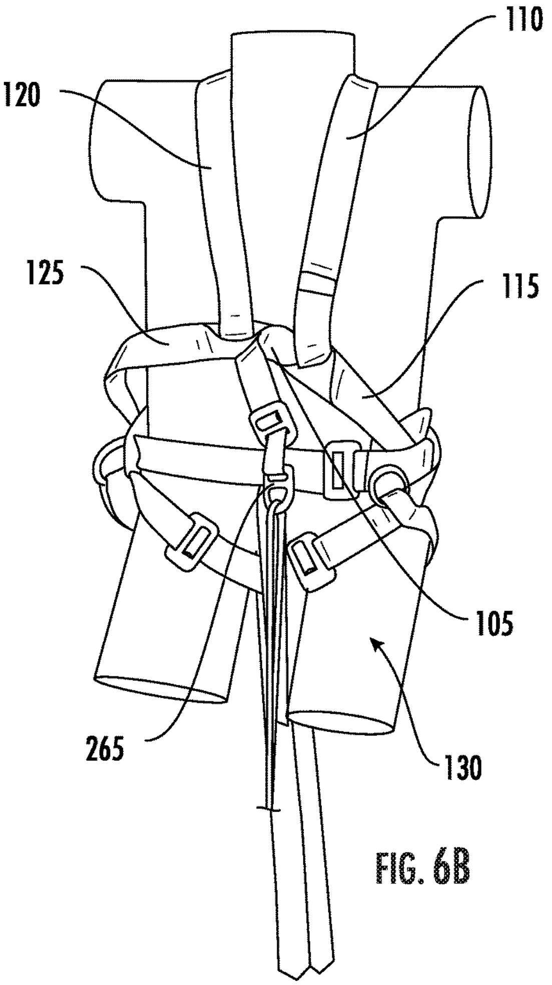
Figure 7A:
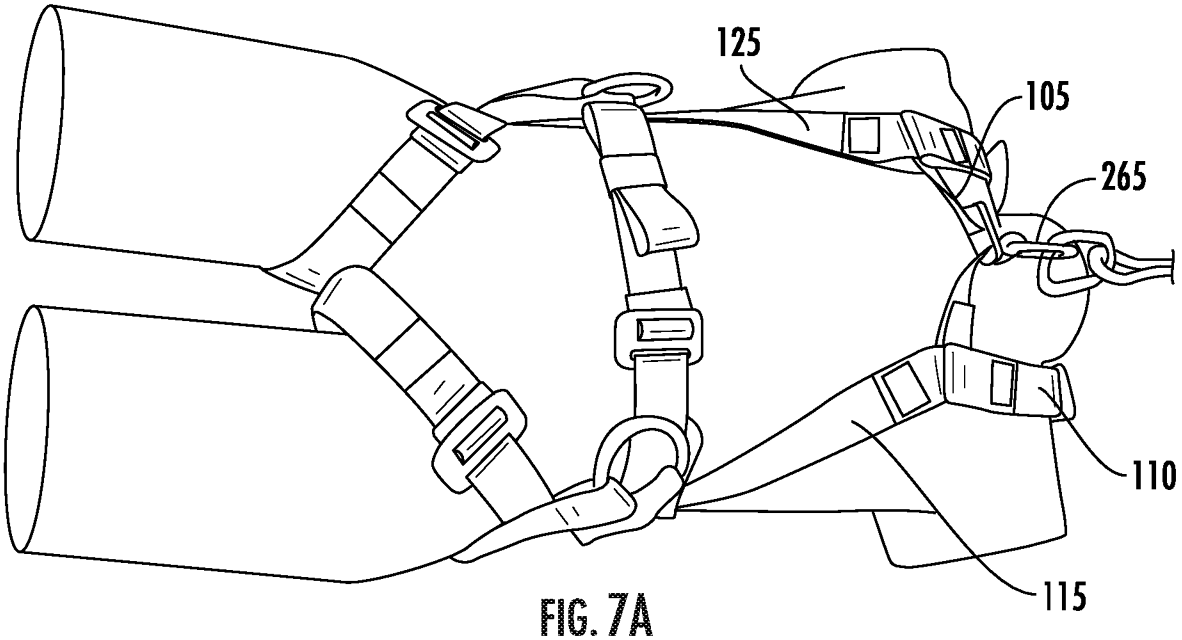
Figure 7B:
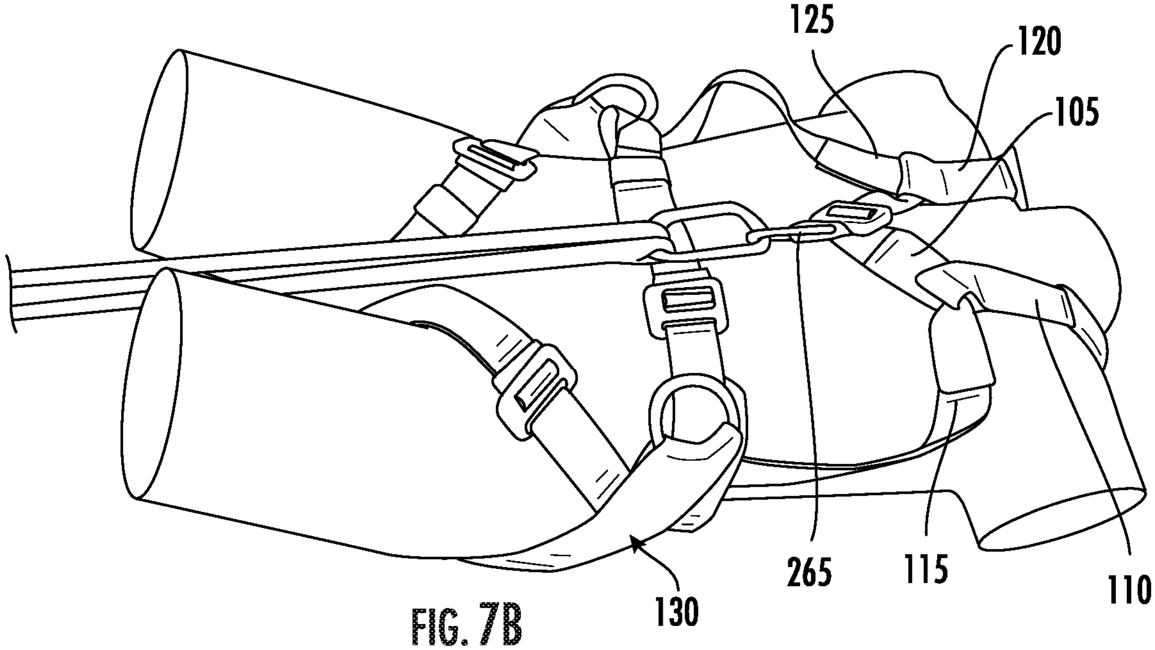

Having thus described certain example embodiments of the present disclosure in general terms, reference will hereinafter be made to the accompanying drawings, which are not necessarily drawn to scale, and wherein:

FIG. 1A is a front view of a harness of an example embodiment as worn during proper operation;

FIG. 1B is a side view of a harness of an example embodiment as worn during proper operation;

FIG. 1C is a rear view of a harness of an example embodiment as worn during proper operation;

FIG. 2 illustrates the horizontal connecting webbing connections in accordance with various embodiments of the present disclosure;

FIG. 3 is a close-up view of the first upper webbing loop and the first lower webbing loop received by the first horizontal receiving loop in accordance with various embodiments;

FIG. 4 is a flowchart illustrating a method of manufacturing in accordance with various embodiments of the present disclosure;

FIG. 5A is a harness of an example embodiment experiencing a dynamic force test in an instance in which the test dummy is dropped in the feet-first direction;

FIG. 5B is a harness of an example embodiment experiencing a dynamic force test in an instance in which the test dummy is dropped in the head-first direction;

FIG. 6A is a harness of an example embodiment experiencing a static force test in an instance in which the test dummy is dropped in the feet-first direction;

FIG. 6B is a harness of an example embodiment experiencing a static force test in an instance in which the test dummy is dropped in the head-first direction; and FIGS. 7A and 7B are additional static testing situations for a harness of an example embodiment.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

Example embodiments of the present disclosure provide various example harness configurations to allow for, in some examples, increased reliability of front anchors during use. In some examples, front anchored harnesses need to be able to withstand dynamic and static tests, such as EN/ANSI/GB or other region standards. Current front anchor harnesses often employ a chest webbing sewed to a single torso webbing on each end of the chest webbing. In such current harnesses, the sewed regions struggle to withstand sufficient force to pass the required testing and therefore cannot be used in operation.

Various example embodiments of the present disclosure use a multi-webbing configuration to allow for a better distributed forces during both static and dynamic operations of a harness. Specifically, example embodiments described herein divide or otherwise separate torso webbing into at least two separate webbings (e.g., upper webbing and lower webbing). In such example embodiments, the at least two separate webbings are mated or otherwise connected by way of a chest webbing (e.g., horizontal connecting webbing). Advantageously, and in some examples, when force is applied to the chest webbing by way of a force acting on a force receiving mechanism (e.g., a D-Ring) the force is concentrated, in some examples, on folds or loops in the at least two separate webbings and, in some examples, avoids or otherwise diminishes stress and/or tearing on a sewing pattern on the at least two separate webbings. Additionally, various embodiments discussed herein may allow for reduced manufacturing costs and increased ease of manufacturing.

FIGS. 1A-1C are various different views of a harness of an example embodiment as worn during operation. Specifically, FIG. 1A illustrates a front view of an example embodiment as worn during operation, FIG. 1B illustrates a side view of an example embodiment as worn during operation, and FIG. 1C illustrates a rear view of an example embodiment as worn during operation.

As shown in FIG. 1A, the harness 100 may have an upper harness portion 101 configured to be worn on the upper body of a user during operation and a lower harness portion 130 configured to be worn on the waist and/or below the waist of the user during operation. In various embodiments, as discussed in more detail below with reference to FIGS. 2 and 3, the upper harness portion 101 may include a first upper webbing 110, a first lower webbing 115, a second upper webbing 120, a second lower webbing 125, and a horizontal connecting webbing 105.

In various embodiments, each of the first upper webbing 110 and the first lower webbing 115 may be attached to the horizontal connecting webbing 105 at a first end 155 of the horizontal connecting webbing. In various embodiments, each of the second upper webbing 120 and the second lower webbing 125 may be attached to the horizontal connecting webbing 105 at a second end 160 of the horizontal connecting webbing 105. In various embodiments, the horizontal connecting webbing 105 may include a fastening mechanism 260 configured to allow the harness to be removed and/or equipped. In various embodiments, the horizontal connecting webbing 105 may include a force receiving mechanism 265 configured to receive a clip, rope, cable, carabiner, and/or the like. In some embodiments, the force receiving mechanism 265 may be a D-ring that is attached to the horizontal connecting webbing 105. In some embodiments, the force receiving mechanism 265 may be a webbing loop (e.g., similar to the loops discussed herein).

In various embodiments, the lower harness portion 130 may include a waist webbing 135, and one or more leg webbings 140, 145. In various embodiments, various components of the upper harness portion 101 may be attached to various components of the lower harness portion 130. For example, as shown, each of the first lower webbing 115 and the second lower webbing 125 may be attached to the waist webbing 135. In some embodiments, as shown in FIG. 1B, the first upper webbing 110 and the second upper webbing 120 may each be attached to one of the leg webbings 140, 145. In various embodiments, the first upper webbing 110 and the second upper webbing 120 may be configured to cross over one another (e.g., within a webbing crossing housing 150) along the back of a user when equipped. In some embodiments, as shown, additional force receiving mechanisms may be placed at various positions along the harness for different application (e.g., a force receiving mechanism is provided within the webbing crossing housing 150).

In various embodiments, the material of the various webbings may be based on a given application of the harness. In various embodiments, the various webbings discussed herein may be made out of polyester, nylon, and/or the like. In various embodiments, the size and shape of the webbings may be based on the weight to be carried during operation. In various embodiments, the webbing size (e.g., thickness, width), webbing material, and/or attachment methods (e.g., sewing pattern may be increased) may be chosen based on the weight to be carried during operation (e.g., a 125 kg harness may have webbing with a larger thickness than the webbing of a 100 kg harness).

FIG. 2 illustrates horizontal connecting webbing connections in accordance with various embodiments of the present disclosure. In various embodiments, the horizontal connecting webbing 105 may have a first horizontal receiving loop 200 defined at the first end 155 of the horizontal connecting webbing 105 (or 105A in an instance in which the horizontal connecting webbing 105 may have a fastening mechanism 260A, 260B). As shown in more detail in FIG. 3, the horizontal connecting webbing 105 may be folded over itself to allow for the first horizontal receiving loop 200 to be created (e.g., folded over itself and attached at attachment point 210). In some embodiments, the first upper webbing 110 is folded onto itself, such that a first upper webbing loop 220 is created (e.g., the loop end 240 of the first upper webbing 110 may be attached to itself at a first upper webbing attachment point 270). The first upper webbing loop 220 is passed through the first horizontal receiving loop 200 such that the first upper webbing loop 220 and the first horizontal receiving loop 200 are linked. In various embodiments, the attachment of the first upper webbing 110 to itself may be achieved via sewing. In some embodiments, the first lower webbing 115 is folded onto itself, such that the first lower webbing loop 225 is created (e.g., the loop end 245 of the first lower webbing 115 may be attached to itself at a first lower webbing attachment point 275). The first lower webbing loop 225 is passed through the first horizontal receiving loop 200, such that the first lower webbing loop 225 and the first horizontal receiving loop 200 are linked. In various embodiments, the attachment of the first lower webbing 115 to itself may be achieved via sewing.

In various embodiments, the first upper webbing 110 and the first lower webbing 115 are independent from one another, such that the first upper webbing 110 and the first lower webbing 115 are able to move relative to one another during operation. In various embodiments, the first upper webbing loop 220 of the first upper webbing 110 and the first lower webbing loop 225 of the first lower webbing 115 may each independently engage with the first horizontal receiving loop 200, such that the first upper webbing 110 and the first lower webbing 115 are able to move relative to one another within the first horizontal receiving loop 200.

In various embodiments, the horizontal connecting webbing 105 may have a second horizontal receiving loop 205 defined at the second end 160 of the horizontal connecting webbing 105 (or 105B in an instance in which the horizontal connecting webbing 105 may have a fastening mechanism 260A, 260B, as shown in FIG. 2). In various embodiments, the horizontal connecting webbing 105 may be folded over itself to allow for the second horizontal receiving loop 205 to be created (e.g., folded over itself and attached at attachment point 215). In some embodiments, as shown, the second upper webbing 120 may be passed through the second horizontal receiving loop 205.

In some embodiments, the second upper webbing 120 is folded onto itself, such that a second upper webbing loop 230 is created (e.g., the loop end 250 of the second upper webbing 120 may be attached to itself at a second upper webbing attachment point 280). The second upper webbing loop 230 is passed through the second horizontal receiving loop 205, such that the second upper webbing loop 230 and the second horizontal receiving loop 205 are linked. In various embodiments, the attachment of the second upper webbing 120 to itself may be achieved via sewing.

In some embodiments, the second lower webbing 125 is folded onto itself, such that the second lower webbing loop 235 is created (e.g., the loop end 255 of the second lower webbing 125 may be attached to itself at a second lower webbing attachment point 285). The second lower webbing loop 235 is passed through the second horizontal receiving loop 205, such that the second lower webbing loop 235 and the second horizontal receiving loop 205 are linked. In various embodiments, the attachment of the second lower webbing 125 to itself may be achieved via sewing.

In various embodiments, the second upper webbing 120 and the second lower webbing 125 are independent from one another, such that the second upper webbing 120 and the second lower webbing 125 are able to move relative to one another during operation. In various embodiments, the second upper webbing loop 230 of the second upper webbing 120 and the second lower webbing loop 235 of the second lower webbing 125 may each independently engage with the second horizontal receiving loop 205, such that the second upper webbing 120 and the second lower webbing 125 are able to move relative to one another within the second horizontal receiving loop 205.

In various embodiments, as shown, the horizontal connecting webbing 105 may be include multiple distinct portions 105A, 105B configured to be connected to one another via a fastening mechanism 260. In some embodiments, the fastening mechanism 260 may be a mating buckle. In some embodiments, the fastening mechanism 260 may define a male connecter 260A and a female connector 260B configured to engage with one another in an instance in which the harness 100 is equipped. In some embodiments, the fastening mechanism 260 may be equidistant from the first end 155 and the second end 160 of the horizontal connecting webbing 105. In some embodiments, a force receiving mechanism 265 may attached to the horizontal connecting webbing 105. In various embodiments, the force receiving mechanism 265 may be proximate the fastening mechanism 260. In various embodiments, the force receiving mechanism 265 may be a D-ring. In various embodiments, the force receiving mechanism 265 may be configured to be attached to clip, rope, cable, carabiner, and/or the like FIG. 4 is a flowchart illustrating a method of manufacturing a harness in accordance with various embodiments of the present disclosure. Referring now to Block 400 of FIG. 4, the method of manufacturing the harness may include providing a horizontal connecting webbing with a force receiving mechanism and a first horizontal receiving loop at a first end of the horizontal connecting webbing. In various embodiments as discussed above, the first horizontal receiving loop 200 may be created by folding the horizontal connecting webbing 105. For example, the horizontal connecting webbing 105 may be folded onto itself and attached at the first horizontal receiving loop attachment point 210. In various embodiments, the first horizontal receiving loop 200 may be sufficient size to receive both the first upper webbing 110 and the first lower webbing 115. For example, the first horizontal receiving loop 200 may define a thickness of at least the combined thickness of the first upper webbing 110 and the first lower webbing 115. Additionally, the first horizontal receiving loop 200 may define a width at least the width of the larger of the first upper webbing 110 and the first lower webbing 115.

Referring now to Block 410 of FIG. 4, the method of manufacturing the harness may include creating an upper webbing loop of a first upper webbing by passing the first upper webbing through the first horizontal receiving loop at the first end of the horizontal connecting webbing. In various embodiments, the first upper webbing loop 220 may be created by attaching the loop end 240 of the first upper webbing 110 to the another portion of the first upper webbing (e.g., at the first upper webbing attachment point 270).

Referring now to Block 420 of FIG. 4, the method of manufacturing the harness may include creating a lower webbing loop of a first lower webbing by passing the first lower webbing through the first horizontal receiving loop at the first end of the horizontal connecting webbing. In various embodiments, the first lower webbing loop 225 may be created by attaching the end of the first lower webbing 115 to the another portion of the first lower webbing 115 (e.g., at the first lower webbing attachment point 275).

Referring now to Block 430 of FIG. 4, the method of manufacturing the harness may include providing a second receiving loop at a second end of the horizontal connecting webbing opposite the first end of the horizontal connecting webbing. In various embodiments, the second horizontal receiving loop 205 may be created at the opposite end of the first horizontal receiving loop 200. In various embodiments, the second horizontal receiving loop 205 may be created by folding the horizontal connecting webbing 105 (e.g., or 105B). For example, the horizontal connecting webbing 105 may be folded onto itself and attached at the second horizontal receiving loop attachment point 215. In various embodiments, the second horizontal receiving loop 205 may be sufficient size to receive both the second upper webbing 120 and the second lower webbing 125. For example, the second horizontal receiving loop 205 may define a thickness of at least the combined thickness of the second upper webbing 120 and the second lower webbing 125. Additionally, the second horizontal receiving loop 205 may define a width at least the width of the larger of the second upper webbing 120 and the second lower webbing 125.

Referring now to Block 440 of FIG. 4, the method of manufacturing the harness may include creating an upper webbing loop of a second upper webbing by passing the second upper webbing through the second horizontal receiving loop at the second end of the horizontal connecting webbing. In various embodiments, the second upper webbing loop 230 may be created by attaching the loop end 250 of the second upper webbing 120 to the another portion of the second upper webbing (e.g., at the second upper webbing attachment point 280).

Referring now to Block 450 of FIG. 4, the method of manufacturing the harness may include creating a lower webbing loop of a second lower webbing by passing the second lower webbing through the second horizontal receiving loop at the second end of the horizontal connecting webbing. In various embodiments, the second lower webbing loop 235 may be created by attaching the end of the second lower webbing 125 to the another portion of the second lower webbing 125 (e.g., at the second lower webbing attachment point 285).

In some embodiments, the method of manufacturing the harness may also include providing a lower body harness portion configured to be worn at least around the waist of a user during operation. In various embodiments, the lower body harness portion may include the waist webbing 135 and one or more leg webbings 140, 145. As discussed above, various components of the upper harness portion may be attached to components of the lower harness portion.

FIG. 5A is a harness of an example embodiment experiencing dynamic force testing in an instance in which the test dummy is dropped feet-first from a predetermined height. As shown, the resultant force is in the head-first direction, which is received by the harness 100, causing the horizontal connecting webbing 105 to move in the head-first direction, which applies a substantial portion of the force on the first lower webbing 115 and the second lower webbing 125 (e.g., at the loops 225, 235 of the first lower webbing 115 and the second lower webbing 125). Alternatively, as shown in FIG. 5B, in an instance the harness 100 experiences dynamic force testing in an instance in which the test dummy is dropped head-first from a predetermined height). As shown, the resultant force is in the feet-first direction, which is received by the harness 100, causing the horizontal connecting webbing 105 to move in the feet-first direction, which applies a substantial portion of the force on the first upper webbing 110 and the second upper webbing 120 (e.g., at the loops 220, 230 of the first upper webbing 110 and the second upper webbing 120).

FIG. 6A is a harness of an example embodiment experiencing a horizontal static force test with the test dummy being hung in the feet-first direction. In various embodiments, the operations are similar to the dynamic force shown in FIG. 5A. For example, the resultant force is in the head-first direction, which is received by the harness 100, causing the horizontal connecting webbing 105 to move in the generally head-first direction (e.g., direction is opposite of gravity). As such, the substantial portion of the force is focused on first lower webbing 115 and the second lower webbing 125 (e.g., at the loops 225, 235 of the first lower webbing 115 and the second lower webbing 125). Alternatively, as shown in FIG. 6B, in an instance in which a static force test is applied with the test dummy being hung in the head-first direction. As shown, the resultant force is in the feet-first direction, which is received by the harness 100, causing the horizontal connecting webbing 105 to move in the generally feet-first direction (e.g., along with gravity). As such, the substantial portion of the force is focused on the first upper webbing 110 and the second upper webbing 120 (e.g., at the loops 220, 230 of the first upper webbing 110 and the second upper webbing 120).

FIGS. 7A and 7B are additional testing situations for a harness of an example embodiment. FIG. 7A illustrates a vertical static test in an instance in which the dummy is hung in the feet-first with similar results to FIG. 6A. As shown, the resultant force is in the head-first direction, which is received by the harness 100, causing the horizontal connecting webbing 105 to move in the generally head-first direction (e.g., direction is opposite of gravity). As such, the substantial portion of the force is focused on first lower webbing 115 and the second lower webbing 125 (e.g., at the loops 225, 235 of the first lower webbing 115 and the second lower webbing 125). Additionally, FIG. 7B illustrates a vertical static test in an instance in which the dummy is hung in the head-first directional force with similar results to FIG. 6B. As shown, the resultant force is in the feet-first direction, which is received by the harness 100, causing the horizontal connecting webbing 105 to move in the generally feet-first direction (e.g., along with gravity). As such, the substantial portion of the force is focused on the first upper webbing 110 and the second upper webbing 120 (e.g., at the loops 220, 230 of the first upper webbing 110 and the second upper webbing 120).

The present disclosure provides various example harness configurations to allow for increased reliability of front anchors during use. Front anchored harnesses need to be able to withstand dynamic and static tests, such as EN/ANSI/GB or other region standards. Current front anchor harnesses struggle to pass such tests and therefore cannot be used in operation. Various embodiments of the present disclosure use a multi-webbing configuration to allow for a better distributed forces during both static and dynamic operations of a harness.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A harness for fall protection, the harness comprising:

a horizontal connecting webbing with a front anchor force receiving mechanism, the horizontal connecting webbing comprising a first horizontal receiving loop at a first end of the horizontal connecting webbing, wherein the first horizontal receiving loop is defined by a portion of the horizontal connecting webbing being fixably attached to another portion of the horizontal connecting webbing, the horizontal connecting webbing configured to extend laterally across a front torso;

a first upper webbing configured with a upper webbing loop that is directly engaged with the first horizontal receiving loop at the first end of the horizontal connecting webbing, the first upper webbing extending vertically upward from the horizontal connecting webbing; and, a first lower webbing configured with a lower webbing loop that is directly engaged with the first horizontal receiving loop at the first end of the horizontal connecting webbing, the lower webbing extending vertically downward from the horizontal connecting webbing, wherein the first upper webbing and the first lower webbing are independent of one another.

2. The harness of claim 1, wherein the horizontal connecting webbing further comprises:

a second horizontal receiving loop at a second end of the horizontal connecting webbing opposite the first end of the horizontal connecting webbing, the harness further comprising:

a second upper webbing configured with an upper webbing loop to be directly received by the second horizontal receiving loop at the second end of the horizontal connecting webbing; and, a second lower webbing configured with a lower webbing loop to be directly received by the second horizontal receiving loop at the second end of the horizontal connecting webbing, wherein the second upper webbing and the second lower webbing are independent of one another; and wherein the second horizontal receiving loop is the second end of the horizontal connecting webbing fixably attached to another portion of the horizontal connecting webbing.

3. The harness of claim 2, further comprising a lower body harness portion attached to at least one of the first upper webbing, the first lower webbing, the second upper webbing, or the second lower webbing, the lower body harness portion configured to be worn at least around the waist of a user during operation.

4. The harness of claim 3, wherein the lower body harness portion comprises a waist webbing attached to at least one of the first lower webbing or the second lower webbing, the waist webbing configured to be sit at approximately the waist of a user during operation.

5. The harness of claim 3, wherein the first upper webbing is attached to the lower body harness portion at an end of the first upper webbing opposite the upper webbing loop.

6. The harness of claim 3, wherein the lower body harness portion further comprises one or more leg webbings configured to receive a leg of a user during operation.

7. The harness of claim 1, wherein the upper webbing loop is an end of the first upper webbing fixably attached to another portion of the first upper webbing and the lower webbing loop is an end of the first lower webbing fixably attached to another portion of the first lower webbing.

8. The harness of claim 1, wherein the horizontal connecting webbing comprises a fastening mechanism configured to connect and disconnect the horizontal connecting webbing for removal.

9. The harness of claim 8, wherein the fastening mechanism is defined equidistant from the first end of the horizontal connecting webbing and a second end of the horizontal connecting webbing.

10. The harness of claim 1, wherein the force receiving mechanism is a D ring.

11. A method of manufacturing a harness for fall protection, the method comprising:

providing a horizontal connecting webbing with a front anchor force receiving mechanism;

forming a first horizontal receiving loop at a first end of the horizontal connecting webbing by folding a portion of the horizontal connecting webbing back upon itself;

creating an upper webbing loop of a first upper webbing by passing the first upper webbing through the first horizontal receiving loop at the first end of the horizontal connecting webbing; and, creating a lower webbing loop of a first lower webbing by passing the first lower webbing through the first horizontal receiving loop at the first end of the horizontal connecting webbing, wherein the horizontal connecting webbing is configured to extend laterally across a front torso, the first upper webbing extending vertically upward from the horizontal connecting webbing and the first lower webbing extending vertically downward from the horizontal connecting webbing, wherein the first upper webbing and the first lower webbing are independent of one another.

12. The method of claim 11 further comprising:

forming a second horizontal receiving loop at a second end of the horizontal connecting webbing opposite the first end of the horizontal connecting webbing by folding a second end of the horizontal connecting webbing back upon itself;

creating an upper webbing loop of a second upper webbing by passing the second upper webbing through the second horizontal receiving loop at the second end of the horizontal connecting webbing; and, creating a lower webbing loop of a second lower webbing by passing the second lower webbing through the second horizontal receiving loop at the second end of the horizontal connecting webbing, wherein the second upper webbing and the second lower webbing are independent of one another.

13. The method of claim 12, further comprising attaching a lower body harness portion to at least one of the first upper webbing, the first lower webbing, the second upper webbing, or the second lower webbing, the lower body harness portion, the lower body harness portion configured to be worn at least around the waist of a user during operation.

14. The method of claim 13, wherein the lower body harness portion comprises a waist webbing attached to at least one of the first lower webbing or the second lower webbing, the waist webbing configured to be sit at approximately the waist of a user during operation.

15. The method of claim 13, wherein the first upper webbing is attached to the lower body harness portion at an end of the first upper webbing opposite the upper webbing loop.

16. The method of claim 13, wherein the lower body harness portion further comprises one or more leg webbings configured to receive a leg of a user during operation.

17. The method of claim 11, wherein the upper webbing loop is created by attaching an end of the first upper webbing to another portion of the first upper webbing and the lower webbing loop is created by attaching an end of the first lower webbing to the another portion of the first lower webbing.

18. The method of claim 11, further comprising providing a fastening mechanism on the horizontal connecting webbing configured to connect and disconnect the horizontal connecting webbing for removal.

19. The method of claim 18, wherein the fastening mechanism is defined equidistant from the first end of the horizontal connecting webbing and a second end of the horizontal connecting webbing.

20. The method of claim 11, wherein the force receiving mechanism is a D ring.

* * * * *